(12) United States Patent
Baas

(10) Patent No.: US 6,915,366 B2
(45) Date of Patent: Jul. 5, 2005

(54) COMPUTER SYSTEM WITH A COMMUNICATION BUS

(75) Inventor: Ramon Johan Wessel Baas, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 258 days.

(21) Appl. No.: 10/270,359

(22) Filed: Oct. 11, 2002

(65) Prior Publication Data

US 2003/0088717 A1 May 8, 2003

(30) Foreign Application Priority Data

Oct. 16, 2001 (EP) ............................................. 01203937

(51) Int. Cl.⁷ ............................................... G06F 13/36
(52) U.S. Cl. ...................... 710/113; 710/119; 710/124; 710/125
(58) Field of Search ................................. 710/113, 119, 710/124–125

(56) References Cited

U.S. PATENT DOCUMENTS

| | | | | |
|---|---|---|---|---|
| 5,146,607 A | | 9/1992 | Sood et al. | |
| 5,619,661 A | * | 4/1997 | Crews et al. | ............... 710/119 |
| 5,933,610 A | * | 8/1999 | Chambers et al. | .......... 711/113 |
| 6,212,590 B1 | * | 4/2001 | Melo et al. | ................. 710/119 |
| 6,321,284 B1 | * | 11/2001 | Shinohara et al. | .......... 710/113 |
| 6,363,447 B1 | * | 3/2002 | Larson | ....................... 710/113 |
| 6,662,251 B2 | * | 12/2003 | Brock et al. | ................ 710/110 |

* cited by examiner

Primary Examiner—Tim Vo
(74) Attorney, Agent, or Firm—Peter Zawilski

(57) ABSTRACT

A bus has a local section (10a,b) and a shared section (11a,b). An arbiter circuit (16) issues an arbited grant (25) to access the shared section (11a,b) in response to a request (22) to perform a bus access transaction. A bus station (12) has a request output (17a) for issuing the request to the arbiter (16), the bus station (12) having a grant input (19c) arranged to receive a local grant (24) in response to the request (22), independently of the arbited grant (25). The bus station (12) is arranged to start the transaction, applying an address to the local section (10a,b) in response to the local grant (24) in a bus cycle following the local grant (24). A bridge circuit (16) provides a coupling between the local section (10a,b) and shared section (11a,b). The bridge station receives the arbited grant (25) and enables the coupling to pass the address to the shared section (11a,b) in said bus cycle conditional on the arbited grant (25). The bridge circuit (16) signals the station (12) to disable progress of the transaction when it detects that the address addresses a bus unit (14b,c) on the shared bus (11a,b) and no arbited grant (25) is received in response to the request (22) before said bus cycle.

8 Claims, 6 Drawing Sheets

COMPUTER SYSTEM WITH A COMMUNICATION BUS

The invention relates to a computer system, and more in particular to arbitration of access to a bus in the computer system.

It is known to provide computer systems with a shared bus via which different stations can apply addresses to devices such as memories. Only one of the stations can apply an address to the bus at a time. An arbiter is used to prevent that more than one station applies an address: before accessing the bus the station requests permission to access the bus, the arbiter decides which of the requesting stations will be granted access and signals this to the stations. The relevant station then starts a bus transaction by applying the address to the bus.

U.S. Pat. No. 5,146,607 discloses a computer system in which a number of processors is connected as stations to a shared bus. In U.S. Pat. No. 5,146,607 the shared bus is combined with a local bus for each processor. No arbitration between processors is needed when a processor addresses a local memory connected to its local bus. No time is lost to arbitration when an address that addresses the local memory is applied. Arbitration is started only when an address is applied that addresses a memory via the shared bus. The local bus and the shared bus are connected via a bridge circuit. The bridge circuit detects addresses of the memory that is connected to the shared bus. Upon detection the bridge circuit requests access to the shared bus. For this the bridge circuit will have to participate in arbitration. As a result, addressing a memory via the shared bus will generally be slower than addressing a memory on the local bus.

It is inter alia an object of the invention to provide a computer system in which the time lost to arbitration is minimized.

It is a further object of the invention to improve the speed of a computer system with a bus station that is designed to apply addresses to a bus only after receiving a bus grant upon requesting access to the bus.

The invention provides a computer system according to claim 1. According to the invention, the arbiters' responses to requests from a station are masked from that station. When the station has to address another station it requests access to the shared bus. In reply, a grant signal is returned to the station immediately, irrespective of the response from the arbiter. Thus, the station can proceed immediately by applying the address. If the addressed unit is on the local bus, the addressed unit responds normally.

If the arbiter grants access to the bus concurrent with the local grant, a bridge circuit passes the address to the shared bus in the same bus cycle in which the address is first applied to the local bus. That is, the address does not have to be latched into a register in the bridge circuit so as to be passed to the shared bus from that register. This prevents delay due to latching. When no grant is received concurrently with the local grant, the bridge circuit blocks the address (and any further communication) from the shared bus. In this case the bridge circuit signals the bus station to disable continuation of the bus transaction.

In an embodiment, the bridge circuit causes the bus station to restart the transaction, starting with a new request to access the bus. This is particularly useful in buses with pipelined access, that is, buses where access requesting, addressing and data transfer for successive transactions are performed simultaneously on the bus, so that the request for a next transaction occurs when the address of the current transaction is being applied to the bus and the data of a previous transaction is carried on the bus. By retracting the transaction a minimum of disruption of pipelining occurs when the transaction needs the shared bus but does not receive an arbited grant, whereas the transaction can continue even if the shared bus is occupied when the address is on the local bus.

In most buses a local grant followed by retraction takes more time than simply not granting access if the shared bus is busy. However, local grant will take less time than waiting for an arbited grant if the shared bus is busy and the address is on the local bus.

In a further embodiment the bridge circuit contains an address range prediction circuit which forms a prediction whether the address following a request will be on the shared bus or on the local bus. If it is predicted that the address will be on the local bus, the local grant will be generated independently of the arbited grant. If it is predicted that the address will be on the shared bus, the bridge circuit disables the local grant in response to the next request following a request for which no arbited grant was received in time, and passes the arbited grant to the bus station.

Any kind of prediction mechanism may be used. For example, an address coherency mechanism which predicts that successive addresses are in the same range, or a more specific mechanism may be used that makes use of knowledge about the task performed by the system.

In a further embodiment an address on the shared bus is predicted when a transaction needs the shared bus but does not receive an arbited grant. Thus, when the bus station retries the transaction after it has been retracted, it is ensured that the bus station can participate normally in arbitration. No more time will be lost to local grant followed by retraction. Alternatively, of course, a local grant retraction may be repeated in response to successive requests until the arbited grant is received.

In another embodiment addresses on the local bus will be predicted if the bus station has applied an address addressing a bus unit on the local bus less than a predetermined number of bus cycles before the prediction.

In another embodiment the state is under program control. Thus, when the bus station is a processor, a computer program may select the state independence on whether the computer program will frequently use resources on the local bus or not. For example, when the processor is designed to execute either code directly from memory or code translated from virtual machine instructions in memory, the memory being connected to the shared bus and a translator for virtual machine instructions being located on the local bus, the processor may set the bridge circuit to use local grant independently of arbited grant when executing virtual machine instructions, but not when executing native code.

In another embodiment a further bus unit is coupled to the local bus. The further bus unit is a bus unit capable of being addressed by the bus station and of addressing other bus units. This embodiment uses the source of each request, the bus station or the further bus station, to determine whether a local grant independent of the arbited grant will be used. When the further bus station requests access, the arbited grant is used to grant access. When the bus station requests access, the local grant independent of the arbited grant is used. Thus, knowledge of the addresses that both stations are most likely to issue is used to minimize delay.

These and other objects and advantageous aspects of the computer system according to the invention will be described in more detail hereinafter, by way of example, with reference to the following figures.

Figure 1:
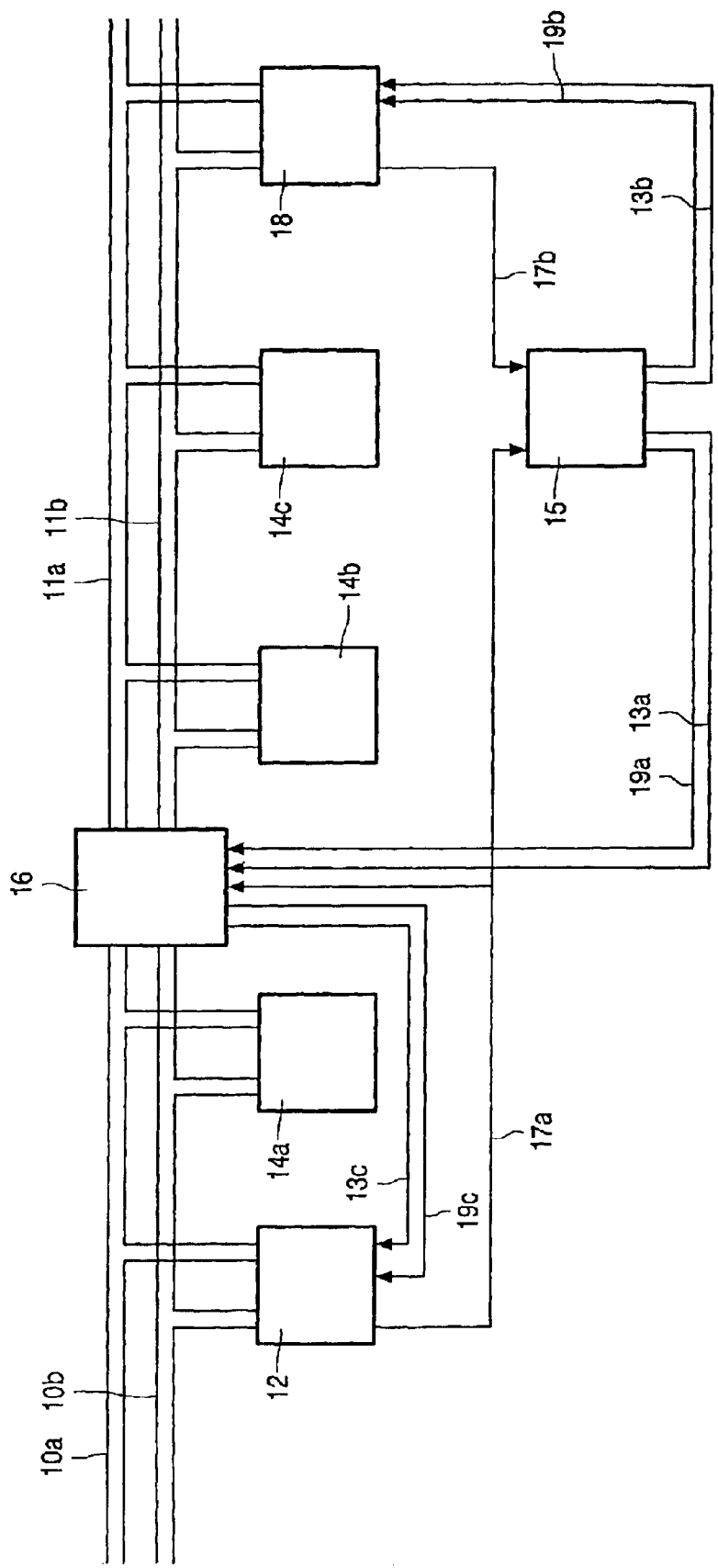
FIG. 1 shows a computer system.

FIG. 1 shows a computer system. The computer system includes a bus with a local section 10a–b and a shared section 11a–b, which will be referred to as the local bus 10a–b and the shared bus 11a,b. The computer system also includes a bus station 12, bus units 14a–c, an arbiter 15, a bridge circuit 16, and a further bus station 18. The local bus 10a–b and the shared bus 11a–b comprise address lines 10a, 11a and data lines 10b, 11b. The station 12 and a first bus unit 14a are connected to the local bus 10a,b. A second and a third bus unit 14b,c and the further station are connected to the shared bus 11a,b. The local bus 10a,b and the shared bus 11a,b are connected via the bridge circuit 16.

The station 12 and the further station 18 have request outputs coupled to respective request lines 17a,b to the arbiter 15. The request output of the bus station 12 is also coupled to the bridge circuit 16. The arbiter 15 has grant outputs coupled, via respective grant lines 19a,b, to the bridge circuit 16 and the further station 18, respectively. The bridge circuit 16 has a grant output coupled, via a local grant line 19c, to the bus station 12. The arbiter 15 has retract outputs coupled to the bridge circuit 16 and the further station 18 via retract lines 13a,b. The bridge circuit 16 has a retract output coupled, via a local retract line 13c, to the bus station 12.

In operation the station 12 addresses the bus units 14a–c via the local bus 10a–b and the shared bus 11a,b while using a bus grant protocol. Furthermore, the station 18 can also request to access the shared bus 11a,b. The arbiter 15 determines which station 12, 18 is allowed to address the shared bus 11a–b when. The arbiter 15 may use any arbitration mechanism such as, for example, a priority mechanism in which relative priorities are assigned to the stations 12, 18, the station 12, 18 having the highest priority receiving a grant signal first if both stations 12, 18 request access to the shared bus 11a–b at the same time. As another example a round robin arbitration mechanism may be used; the stations 12, 18 then alternately receive highest priority.

Figure 2:
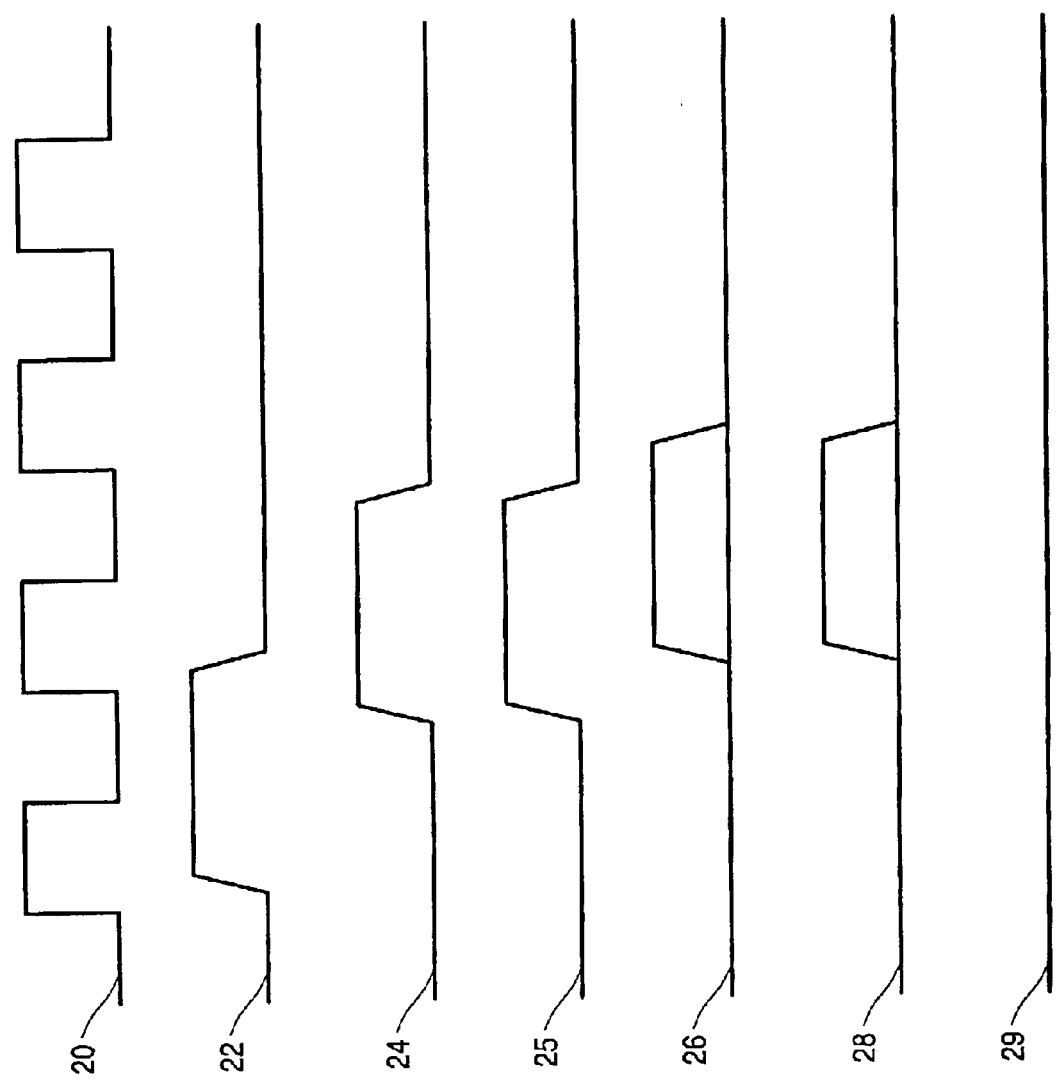
FIGS. 2–5 show signals that occur during bus access.

FIG. 2 shows a clock signal 20, a request signal 22, a local grant signal 24, a shared grant signal 25, a local address signal 26, a shared address signal 28 and a retract signal 29. These signals are used during access to the buses 10a–b, 11a–b. Access starts in a first clock cycle of the clock signal 20 with a request pulse in the request signal 22 from the station 12 to the arbiter 15 via the request line 17a. In response to the local request signal 22, the bridge circuit 16 applies a local grant pulse 24 to the bus station 12 via the local grant line 19c in the first clock cycle. In response to the local grant signal 24 the bus station 12 applies address information in the local address signal 26 to the address lines 10a of the local bus in a next clock cycle.

The arbiter 15 generates a shared grant signal 25 on the shared grant line 19a in response to the request signal 22. The bridge circuit 16 receives the shared grant signal 25 from the arbiter 15. In response the bridge circuit 16 passes the local address signal 26 from the address lines 10a of the local bus to the address lines 11a of the shared bus. Thus, a shared address signal 28 on the address lines 11a of the shared bus becomes equal to the address on the address lines 10a of the local bus. The bridge circuit may realize this for example by means of switches (not shown) between the address lines 10a, 11a of the local bus and the shared bus, the switches being made conductive in a clock cycle following the shared grant signal 25 from the arbiter 15. Alternatively, buffer amplifiers may be used instead of switches.

Figure 3:
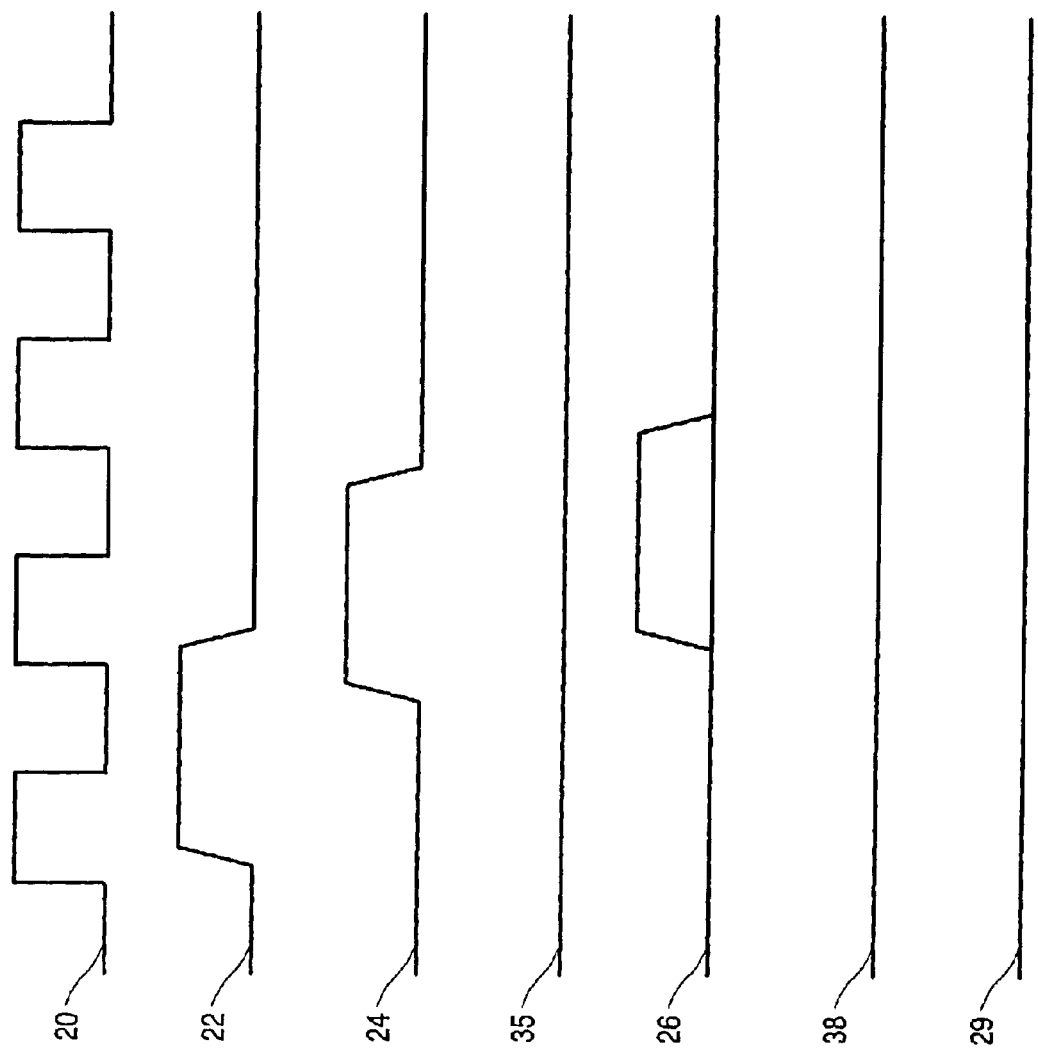

FIG. 3 shows signals when the arbiter 15 does not grant access to the shared bus in response to the request signal 22 and the bus station 12 addresses the bus unit 14a on the local bus 10a,b. In this case the shared grant signal 35 does not contain a grant pulse. The bridge circuit 16 still issues the local grant signal 24, allowing the bus station to proceed with applying the address signal 26. Thus, the bus station 12 is enabled to address the bus unit 14a on the local bus 10a,b. The bridge circuit 16 monitors the address signal 26 applied by the bus station 12 in response to the local grant 24. If the address addresses a bus unit 14a on the local bus 10a,b, the bridge circuit 16 takes no further action.

Figure 4:
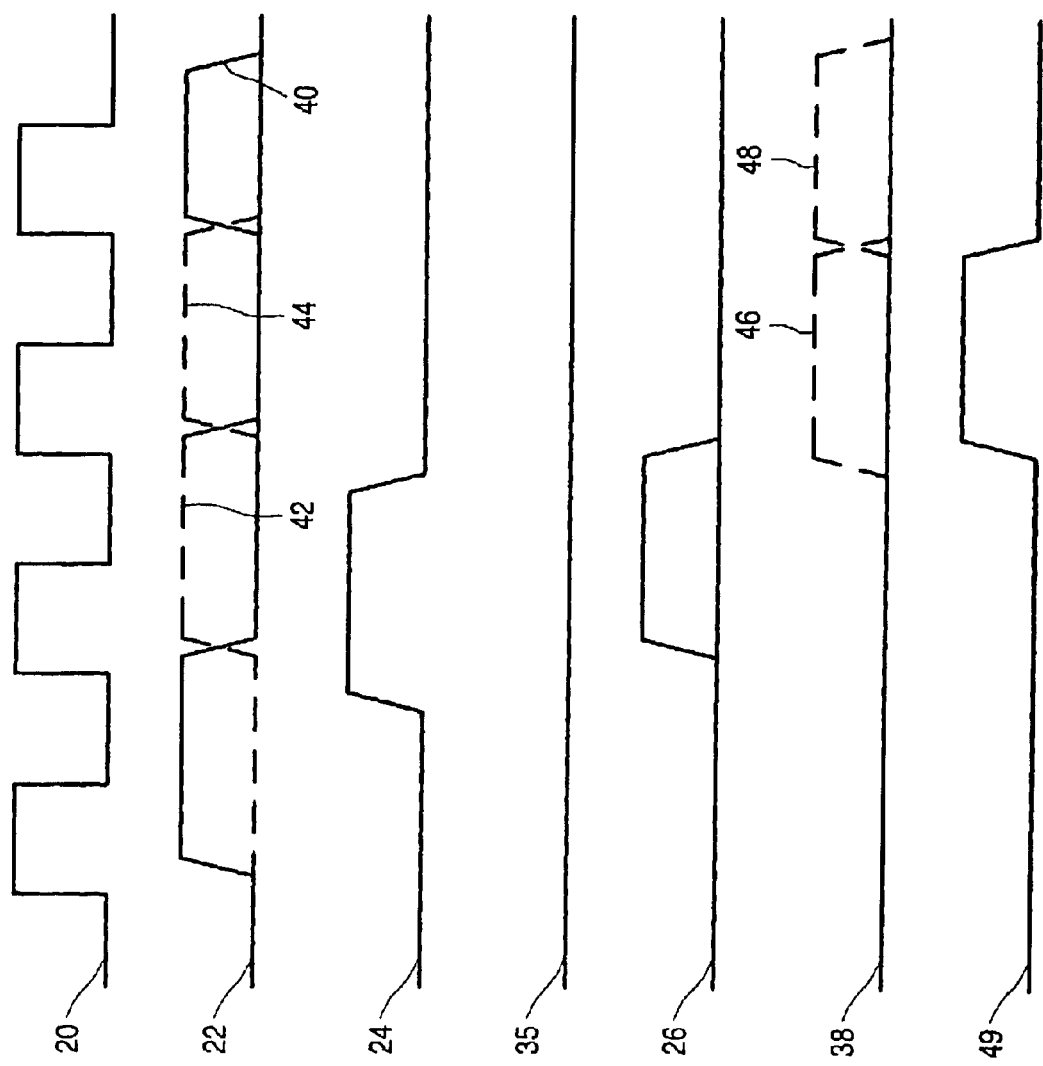

FIG. 4 shows what happens when the arbiter 15 does not grant access to the shared bus 11a,b and the bus station 12 addresses a bus unit 14b,c on the shared bus 11a,b. The bridge circuit 16 detects this situation because it monitors the shared grant signal 35 and the address signal 26 applied by the bus station 12 in response to the local grant 24. If the bus station addresses a bus unit 14b,c on the shared bus 11a,b (or, conversely, if it does not address a bus unit 14a on the local bus 10a,b) and no grant is present in the shared grant signal 35 in response to the request signal 22, the bridge circuit 16 issues a retract pulse in a retract signal 49 and applies this retract signal, via the retract line 13c, to the bus station 12. This causes the bus station 12 to interrupt the bus transaction before it is completed. Subsequently, the bus station 12 retries the transaction by issuing a new request pulse 40 in the request signal 22. Subsequently, the signals of FIG. 3 or 4 may recur.

FIG. 4 also shows (in dashed lines) further request pulses 42, 44 from other bus stations (for example, the station 18 via the request line 17b). For simplicity these pulses are shown on a single line, although it should be understood that these pulses may in fact be present in different signals from different bus stations and that pulses in different signals may be present simultaneously. The request pulses proceed in pipelined fashion: in the clock cycle in which the local grant pulse in the local grant signal 24 is active, a next request 42 is already active. Similarly, addresses 46, 48 applied by the other bus stations when access is granted subsequent to granted requests 42, 44 are applied simultaneously with subsequent requests 44, 40. This pipelining mechanism allows high efficiency usage of the busses 10a,b, 11a,b, but it necessitates that the address information in the address signals 26, 38 is applied only during a single bus cycle and removed in the next cycle to make room for the address following the next granted request. This applies to the address from the bus station 12 as well. Hence the address signal 26 from the bus station 12 applied in response to the local grant signal 24 lasts only one bus cycle and is lost if it addresses a bus unit 14b,c on the shared bus 11a,b when no access is granted by the arbiter 15. To ensure that this does not lead to problems, the bridge circuit 16 issues a pulse in the retract signal 49, forcing the bus station 12 to retry the entire transaction, starting from the new request 40.

This sequence of issuing a local grant followed by a retract takes more time than simply not granting the request, because in the latter case the bus station 12 can immediately issue a new request. Thus, a guaranteed access to the local bus 10a,b (as shown in FIG. 3) is bought at the expense of an increased delay in the case of addressing bus units 14b,c on the shared bus 11a,b, if the request is not immediately granted. Whether this leads to an overall increase in speed depends on the application running on the system, in particular on the frequency with which addresses of local bus units 14a are used and the frequency with which requests are denied (when requests from different stations are issued simultaneously, the arbiter will grant access to one of the requests and deny the others).

In an embodiment, the bridge circuit 16 attempts to predict whether the bus station 12 will address a bus unit 14a on the local bus 10a,b or a bus unit 14b,c on the shared bus 11a,b. Thus, the delay due to a denied shared grant by the arbiter 15 can be reduced. If the prediction is that a bus unit 14a on the local bus will be addressed, the bridge circuit 16 proceeds as described with reference to the FIGS. 2, 3 and 4. If the prediction is that a bus unit 14b,c on the shared bus 11a,b will be addressed, the bridge circuit 16 passes the shared grant from the arbiter 15 to the bus station 12 as a local grant, so that the local grant is issued only if arbiter 15 issues the shared grant.

Figure 5:
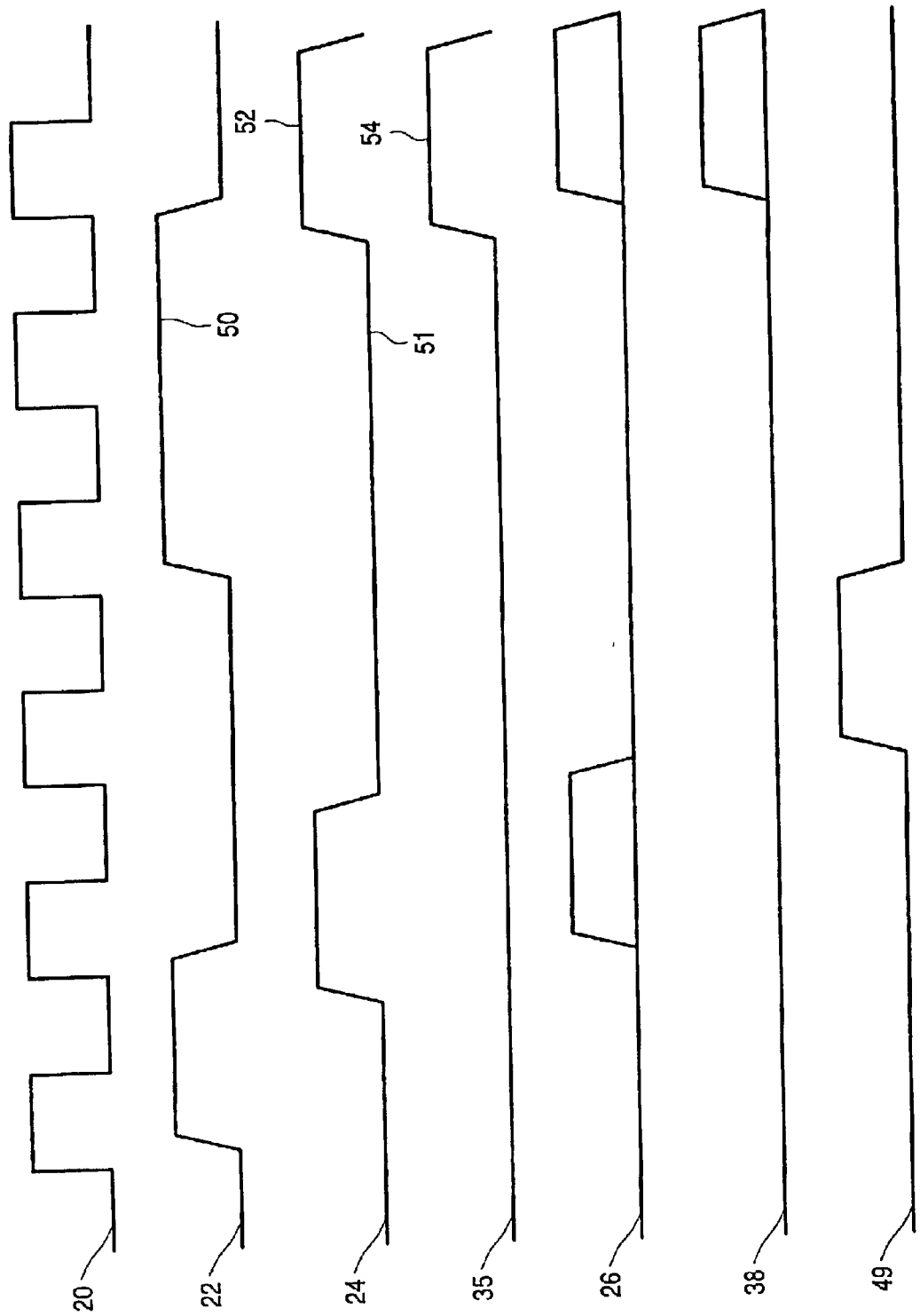

FIG. 5 shows signals in an embodiment where an address of a bus unit 14b,c is predicted after a transaction that was retracted because the arbiter 15 did not grant the request and the bridge circuit 16 found that the address addressed a bus unit 14b,c on the shared bus 11a,b. The initial part of FIG. 5 is similar to FIG. 4 (requests and addresses from other stations not being shown). After the retract pulse in the retract signal 49, the bus station 12 issues a new request 50. The bridge circuit 16 does not immediately issue a local grant pulse in the local grant signal 24. Instead it passes the shared grant signal 35 to the local grant line 19c. This is because the bridge circuit 16 has switched to a state in which an address of a bus unit 14b,c on the shared bus 11a,b is predicted, following the retract signal 49 after an address signal 26 from the bus station 12 addressing a bus unit 14b,c on the shared bus 11a,b.

In a first clock cycle, the arbiter 15 does not grant the request 50 from the bus unit 12. Thereupon the bus unit 12 extends the request 50 to a next clock cycle. When the arbiter 15 issues a grant pulse 52 on the grant line 19a in a subsequent clock cycle, the bridge circuit allows a local grant pulse 54 to develop on the local grant line 19c. Subsequently, the bus station 12 applies address information in the address signal 26 on the local bus 10a,b. The bridge circuit 16 passes this address information to the shared bus 11a,b.

It will be appreciated that the delay from the start of the request pulse 50 to the end of the bus transaction is thus reduced in comparison with the situation where a retract pulse is used.

Various ways of predicting the type of address may be used in the bridge circuit 16 to switch between the first mode of operation illustrated in the FIGS. 2, 3 and 4 and the second mode of operation as shown in the latter part of FIG. 5. Generally speaking, the prediction technique best used depends on the type of application executed by the system. In a first embodiment the prediction of FIG. 5 may be used after a retracted transaction in which the bus station attempted to address a bus unit 14b,c on the shared bus 11a,b when the arbiter 15 did not issue a shared grant. After the transaction in the second mode, the bridge circuit 16 may switch back to the first mode. In a second embodiment, the first mode may be selected subsequent to a transaction in which the bus station 12 addresses a bus unit 14a on the local bus 10a,b, switching back to the second mode in any case after a predetermined number of clock cycles in which the bus station 12 did not address any bus unit 14a on the local bus 10a,b.

In a third embodiment switching between these modes occurs under control of a program executed by the bus station, the program selecting the first mode when it causes the bus station 12 to execute instructions that frequently involve addressing the bus unit 14a on the local bus 10a,b and the second mode when the bus station 12 frequently has to address bus units 14b,c on the shared bus. The various prediction techniques may be combined with one another, for example, by switching to the second mode for one transaction as in the first embodiment and by making more permanent mode switches according to the second and/or third embodiment.

It will appreciated that according to the invention the arbiter 15 is effectively masked from the station 12 in the first mode. To the station 12 it appears as if it requests access and immediately receives a signal granting access. Thus, the station 12 applies the address even if arbiter 15 does not grant access. As long as a bus unit 14a is addressed that is connected to the local bus 10a,b, no further delay due to arbitration occurs. If a bus unit 14b–c on the shared bus 11a–b is addressed the delay due to arbitration appears to the station 12 as if the addressed bus unit 14b–c is slow in responding.

Figure 6:
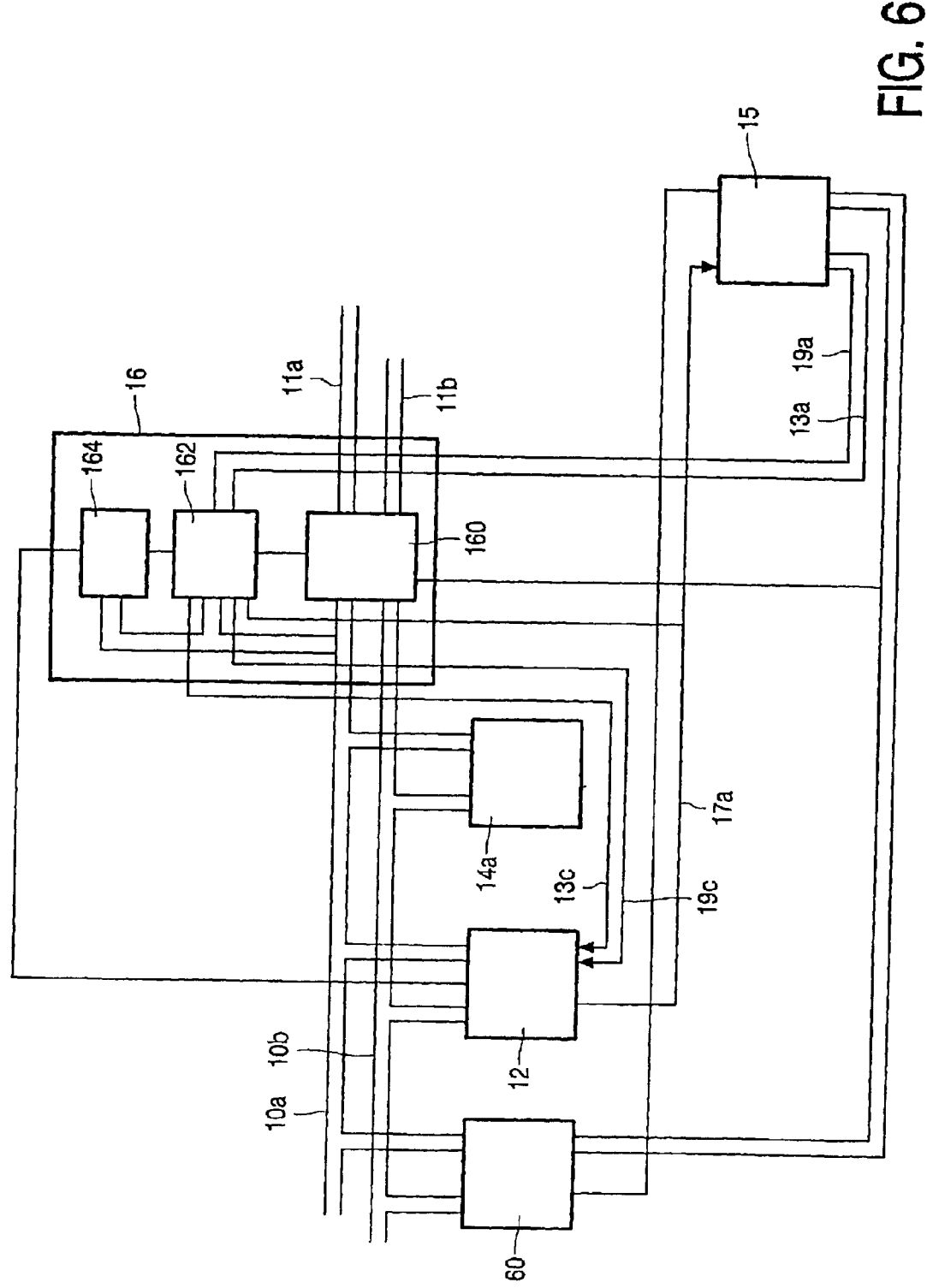
FIG. 6 shows a computer system.

FIG. 6 shows a system in which various additions to the system of FIG. 1 are made apparent. First of all, a further station 60 is shown connected to the local bus 10a,b and with connections for request, grant and retract signals connected to the arbiter 15. In operation the further bus station accesses the bus under direct control of the arbiter 15, i.e. independently of grants by the bridge station 16. When access is granted to the further bus station 60, the bridge circuit 16 activates the coupling between the local bus 10a,b and the shared bus 11a,b.

FIG. 6 also shows a coupling 160, a control circuit 162 and an address range prediction circuit 164 in the bridge circuit 16. The coupling 162 couples the bus sections 10a,b, 11a,b under control of the control circuit 162. The control circuit 162 determines whether the coupling 160 should be activated and whether and when local grant signals, retract signals etc. should be generated. The prediction circuit 164 monitors the addresses to form a prediction of the need to issue a local grant immediately when a subsequent address is issued. This prediction is applied as a control signal to a control circuit 172 to control whether local grant signals are issued immediately. The bus unit 12 has an output coupled to the prediction circuit 164 to signal whether addresses on the local or shared bus are to be expected, for example, under the control of a program executed in the bus station 12. Of course, any other bus station may have such an output as well.

It will be understood that the embodiment shown illustrates only the more important aspects of the system. Nor is the invention limited to the embodiment. For example, in practice some further handshaking may be required between the requesting station 12, 18 and the arbiter 15 to indicate when the bus 11a–b is released again after grant, or whether a bus request is retracted. In one embodiment this may be handled by the bridge circuit 16 for the station 12, or such release signals may be applied from the station 12 directly to the arbiter 15.

Similarly, although access to the local bus 10a–b has been shown to be granted unconditionally to the station 12, in another embodiment local arbitration may be used on this local bus 10a–b. In this case, the grant input 19c is coupled to a local arbiter (not shown) which may be incorporated in the bridge circuit 16 and grants access independently of the arbiter 15. Furthermore, although the bus units 14a–c that are addressable and the stations 12, 18 that can address the bus 11a–b have been shown separately, some or all units may in fact be able to be addressed as well as to address (after requesting access).

What is claimed is:

1. A computer system comprising:
a communication bus with a local section (10a,b) and a shared section for connection of addressable bus units;
an arbiter circuit (16) for issuing an arbited grant (25) to access the shared section (11a,b) in response to a request (22) to perform a bus access transaction;
a bus station (12) coupled to the local section;
a bridge circuit (16) with a coupling between the local section (10a,b) and shared section (11a,b) and coupled to the arbiter (15) for receiving the arbited grant (25), the bridge (16) enabling the coupling to pass the address to the shared section (11a,b) in said bus cycle conditional on the arbited grant (25), characterized in that the bus station (12) has a request output (17a) for issuing the request to the arbiter (16), the bus station having a grant input (19c) arranged to receive a local grant (24) in response to the request (22) independent of the arbited grant (25), the bus station (12) being arranged to start the transaction, applying an address to the local section (10a,b) in response to the local grant (24) in a bus cycle following the local grant (24), the bridge circuit (16) signaling the station (12) to disable progress of the transaction when it detects that the address addresses a bus unit (14b,c) on the shared bus (11a,b) and no arbited grant (25) is received in response to the request (22) before said bus cycle.

2. A computer system as claimed in claim 1, wherein the bridge circuit (16) is arranged to cancel the local grant (24) when the bridge circuit (16) detects that the address addresses a bus unit (14b,c) on the shared bus (11a,b) and no arbited grant (25) is received in response to the request (22) before said bus cycle, the bus station (12) being arranged to restart the transaction beginning with a further request (40) to the arbiter in response to said signaling to disable progress.

3. A computer system as claimed in claim 2, wherein the bridge circuit (16) is switchable between a first and second state, in which issuing local grant (24) signals in response to requests from the station is enabled independently of the arbited grant (25) and enabled conditional on the arbited grant (25), respectively, the bridge circuit (16) containing an address range prediction circuit and switching to the first or the second state independence on whether the address range prediction circuit predicts that a next address from the bus station (12) will address a bus unit (14a) on the local bus or will address a bus unit (14a) on the shared bus (11a,b), respectively.

4. A computer system as claimed in claim 3, wherein the address range prediction circuit is arranged to switch the bridge circuit (16) to the second state when the bridge circuit (16) detects that the address addresses a bus unit (14b,c) on the shared bus (11a,b) and no arbited grant (25) is received in response to the request before said bus cycle.

5. A computer system as claimed in claim 3, wherein the address range prediction circuit is arranged to switch the bridge circuit (16) to the first state upon detecting a transaction with an address of a bus unit (14a) on the local bus and to the second state when no such transactions have been detected during a predetermined number of bus cycles.

6. A computer system as claimed in claim 3, wherein the bus station (12) has a coupling to the bridge circuit (16) to set the bridge circuit (16) to the first and/or second state under program control.

7. A computer system as claimed in claim 1, comprising a further bus station coupled to the local bus, the further bus station (60) being addressable by the bus station and operable to address bus units via the bus, the further bus station (60) having a request output and a grant input coupled to the arbiter (15) so that the further bus station (60) applies a further address to the local bus only after the arbited grant.

8. A method of operating a computer system, wherein the system comprises
    a communication bus with a local section and a shared section for the connection of addressable bus units;
    an arbiter circuit for issuing an arbited grant to access the shared section in response to a request to perform a bus access transaction;
    a bus station;
the method comprising:
    enabling a coupling to pass the address to the shared section conditional on the arbited grant,
    characterized in that the bus station has a request output for issuing the request to the arbiter, the bus station having a grant input arranged to receive a local grant in response to the request, independently of the arbited grant, the bus station being arranged to start the transaction, applying an address to the local section in response to the local grant in a bus cycle following the local grant, the method comprising starting said enabling in said bus cycle and signaling the bus station to disable progress of the transaction when the address addresses a bus unit on the shared bus and no arbited grant is received in response to the request before said bus cycle.

* * * * *